United States Patent [19]

Kubo

[11] Patent Number: 5,883,966
[45] Date of Patent: *Mar. 16, 1999

[54] PORTABLE TELEPHONE WITH A SPEAKER HAVING AN IMPROVED ACOUSTIC CHARACTERISTIC

[75] Inventor: Masato Kubo, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 624,761

[22] Filed: Mar. 27, 1996

[51] Int. Cl.$^6$ .................................................... H04R 25/00
[52] U.S. Cl. .......................... 381/386; 381/345; 379/433; 455/575; 455/90
[58] Field of Search ..................................... 381/157, 188, 381/205, 386, 387, 393, 395; 379/428, 430, 433; 455/575, 90, 347, 351

[56] References Cited

U.S. PATENT DOCUMENTS

| | | | |
|---|---|---|---|
| 5,461,672 | 10/1995 | Enokido et al. | 379/433 |
| 5,603,100 | 2/1997 | Yasuda | 455/89 |
| 5,668,867 | 9/1997 | Nagai | 379/433 |

FOREIGN PATENT DOCUMENTS

| | | | |
|---|---|---|---|
| 0590671 | 4/1994 | European Pat. Off. . | |
| 4177948 | 5/1992 | Japan | 379/428 |

*Primary Examiner*—Huyen Le
*Attorney, Agent, or Firm*—Young & Thompson

[57] ABSTRACT

In a thin foldable telephone or similar portable telephone, a speaker is mounted on an exclusive speaker casing mounted on the body casing of the telephone. The speaker casing is automatically protruded from the body casing when the telephone is used, or retracted into the body casing when the telephone is not used.

18 Claims, 5 Drawing Sheets

PORTABLE TELEPHONE WITH A SPEAKER HAVING AN IMPROVED ACOUSTIC CHARACTERISTIC

BACKGROUND OF THE INVENTION

1. Field of the Invention

The present invention relates to a thin foldable telephone or similar portable telephone and, more particularly, to a miniature portable telephone using a dynamic speaker and having, at the rear of the speaker, a back cabinet whose volume is variable to improve the acoustic characteristic of the speaker.

2. Description of the Related Art

Various kinds of portable telephones extensively used today include a thin foldable telephone and a cordless telephone. The prerequisite with such a portable telephone is that the acoustic characteristic of a speaker be improved in order to enhance the conversation quality, particularly the quality of received speech. This prerequisite has customarily been met by increasing the diameter of a speaker or by using a dynamic speaker. The problem with a dynamic speaker is that sound opposite in phase to sound issuing from the front of the speaker issues from the rear of the same. When the sound output from the rear of the speaker reaches the user's ear, it cancels the sound output from the front and often prevents the sound pressure from being high enough to be heard. In light of this, it is a common practice to form a closed space called a back cabinet behind the speaker.

The back cabinet, however, increases the overall size of the telephone. While the increase in size is not critical with a desk-top telephone or similar telephone made up of a body and a handset, it is vital when it comes to the portable telephone, cordless telephone and so forth which must be miniature.

Usually, when the portable telephone or cordless telephone is miniaturized, the quality of received speech is deteriorated. Particularly, the miniaturization aggravates the acoustic coupling between a speaker and a microphone mounted on the telephone. As a result, echoes are increased to deteriorate the quality of received speech and therefore the conversation quality of the telephone.

SUMMARY OF THE INVENTION

It is therefore an object of the present invention to provide a miniature portable telephone having a speaker whose acoustic characteristic is improved, and free from the deterioration of conversation quality.

It is another object of the present invention to provide a miniature portable telephone having a speaker mounting structure which reduces the acoustic coupling between a speaker and a microphone and thereby reduces echoes.

A telephone of the present invention has a body casing constituting the body thereof, and a speaker casing on which a speaker is mounted. The speaker casing is slidably mounted on the body casing such that it is retracted into the body casing when the telephone is not used or protruded from the body casing when the telephone is used. When the telephone is used, an air chamber is formed behind the speaker mounted on the speaker casing.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
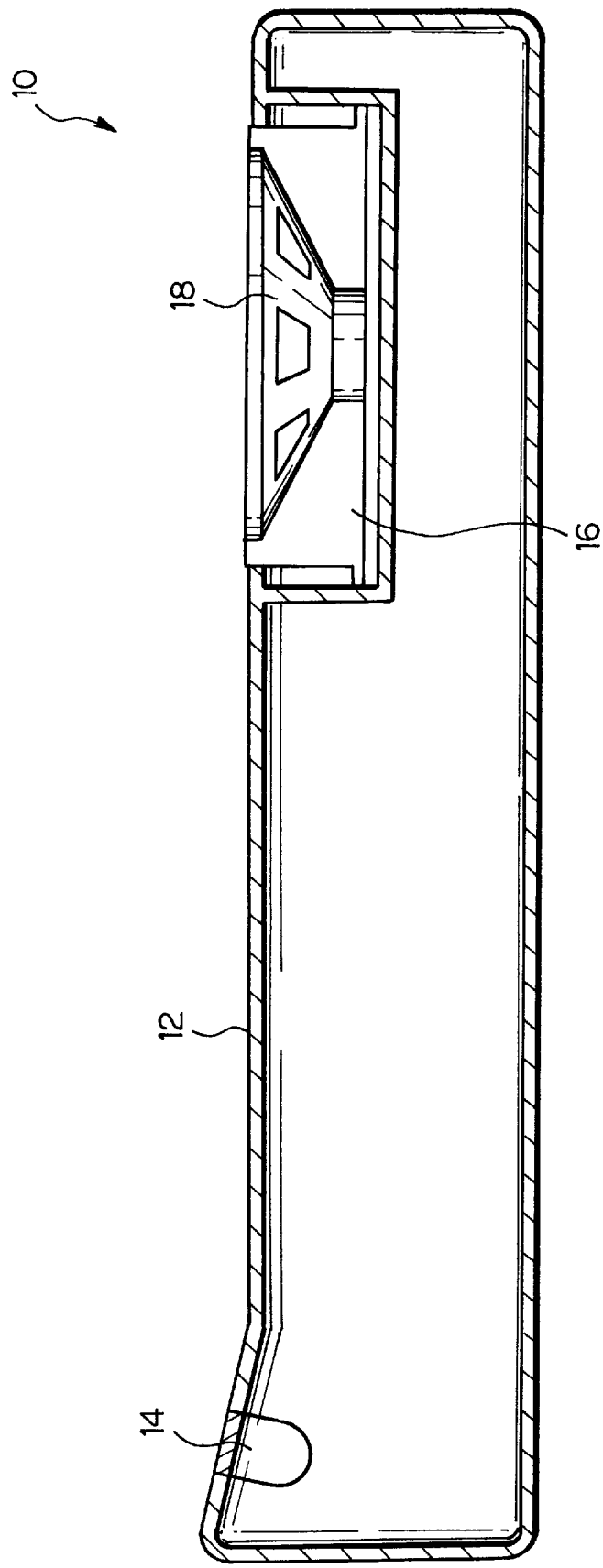
FIG. 1 is a section showing a telephone embodying the present invention in a non-operating position.

Referring to FIG. 1 of the drawings, a portable telephone embodying the present invention is shown in an non-operating position. As shown, the telephone, generally 10, has a body casing 12 constituting the body thereof and a speaker casing 16. A microphone or transmitter 14 is mounted on the body casing 12 while a speaker or receiver 18 is mounted on the speaker casing 16. The speaker casing 16 is received in the body casing 12. The speaker 18 is implemented by a dynamic speaker. In the position shown in FIG. 1, the telephone 10 is as miniature as a conventional portable telephone.

Figure 2:
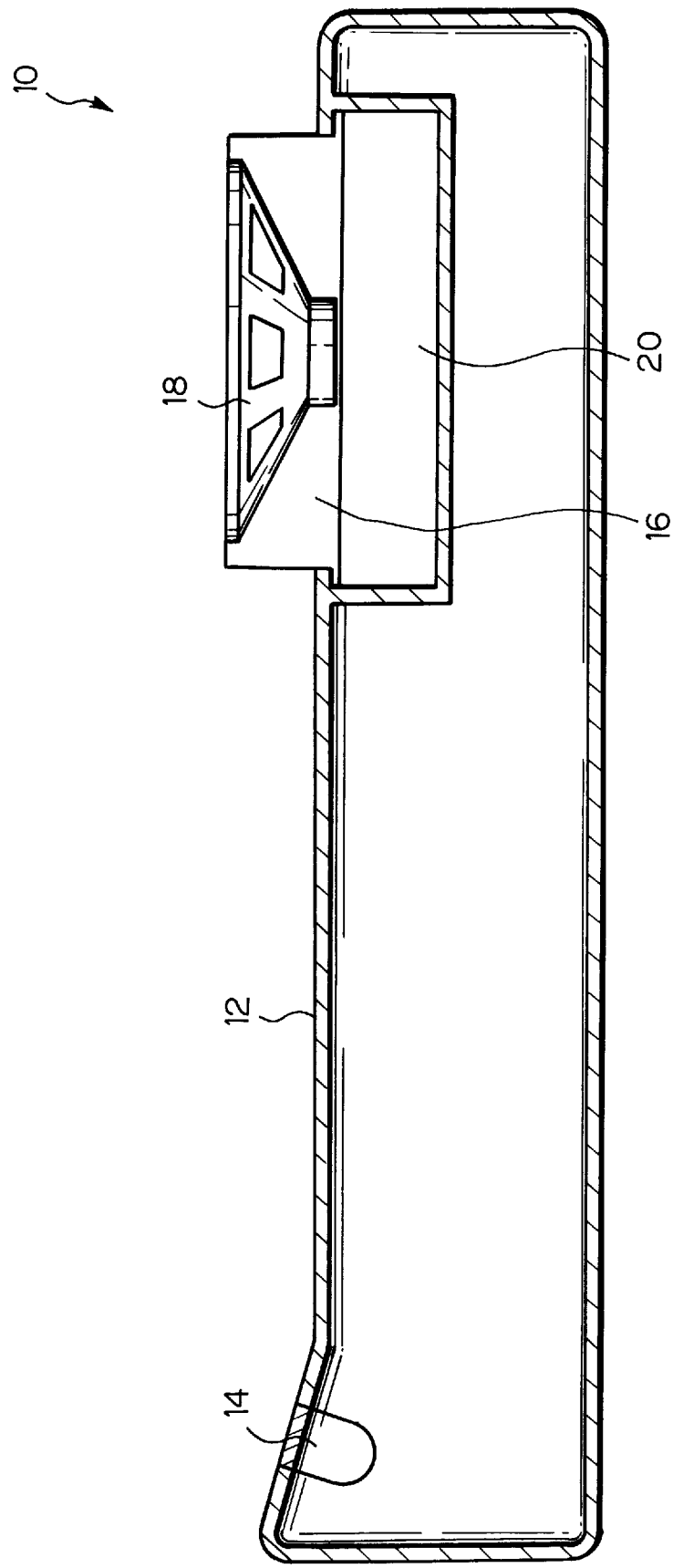
FIG. 2 is a section showing the embodiment of FIG. 1 in an operating position.

FIG. 2 shows the telephone 10 in its operating position. As shown, the speaker casing 16 is slid forward to protrude from the body casing 12. As a result, an air chamber 20 is formed behind the speaker 18. The air chamber 20 plays the role of a back cabinet for preventing sound of opposite phase issuing from the rear of the speaker 18 from leaking to the front. In addition, the air chamber 20 exerts a damping effect on the diaphragm of the speaker 18. Consequently, the air chamber 20 improves the acoustic characteristic of the speaker 18.

As stated above, the speaker casing 16 is retracted into the body casing 12 when the telephone 10 is not used. This successfully improves the quality of received speech without effecting the miniature configuration of the telephone 10.

It is to be noted that the speaker casing 16 is adequately locked to the body casing 12 by suitable locking means in each of the positions shown in FIGS. 1 and 2, although not shown or described specifically.

Figure 3:
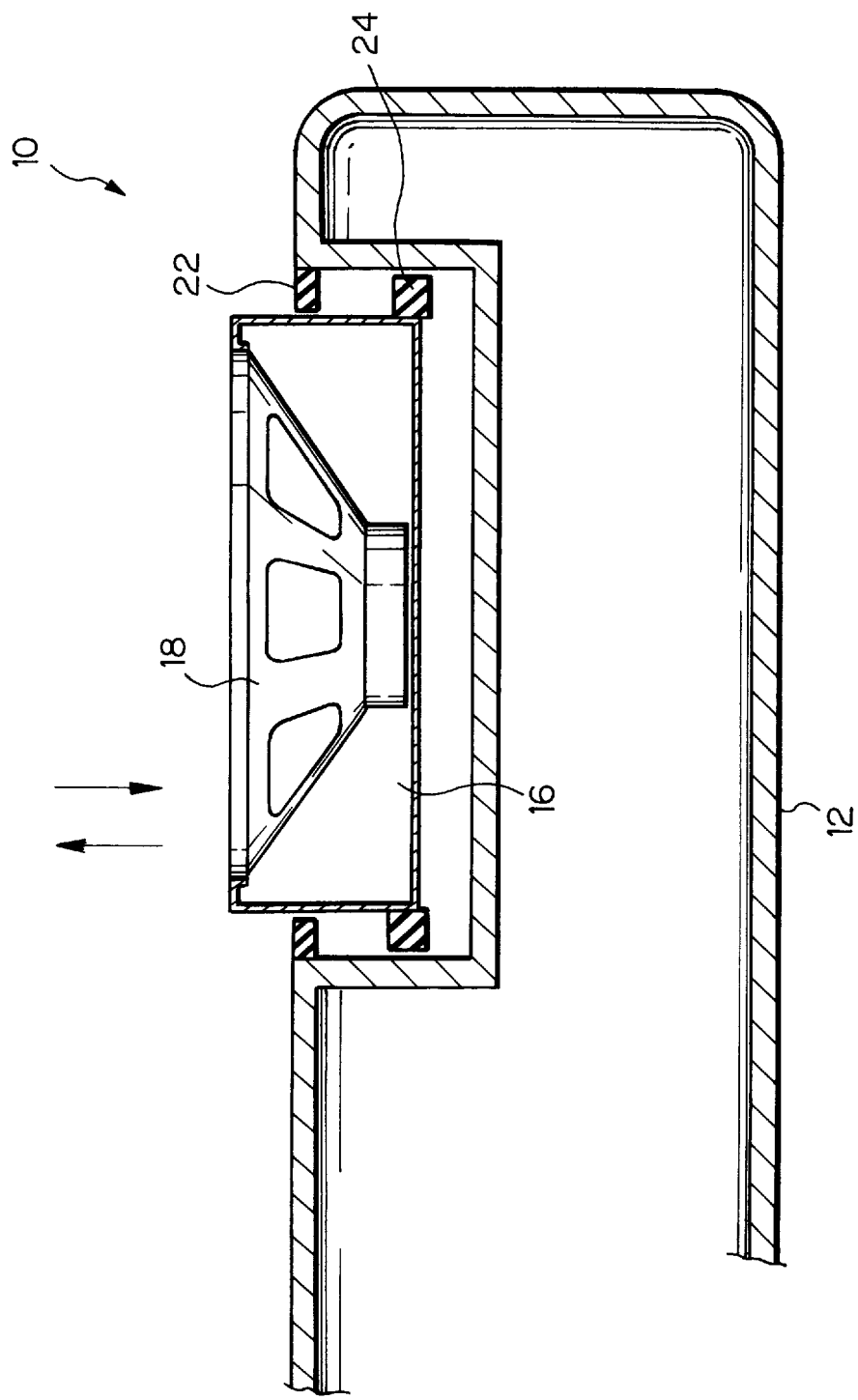
FIG. 3 is a section showing a modification of the embodiment shown in FIGS. 1 and 2.

FIG. 3 shows a modification of the above embodiment. As shown, a first rubber ring 22 and a second rubber ring 24 are fitted on the casing 12 and speaker casing 16, respectively. The rubber rings 22 and 24 damp the vibration of the speaker 18. Specifically, the vibration of the speaker 18 is transferred to the casing 12 via the rubber rings 22 and 24. As a result, the acoustic coupling between the speaker 18 and the microphone 14 is reduced to, in turn, reduce echoes.

This successfully protects the quality of received speech and therefore the conversation quality of the telephone 10 from deterioration. Hence, pleasant conversation is ensured even on a channel having a noticeable delay.

Figure 4:
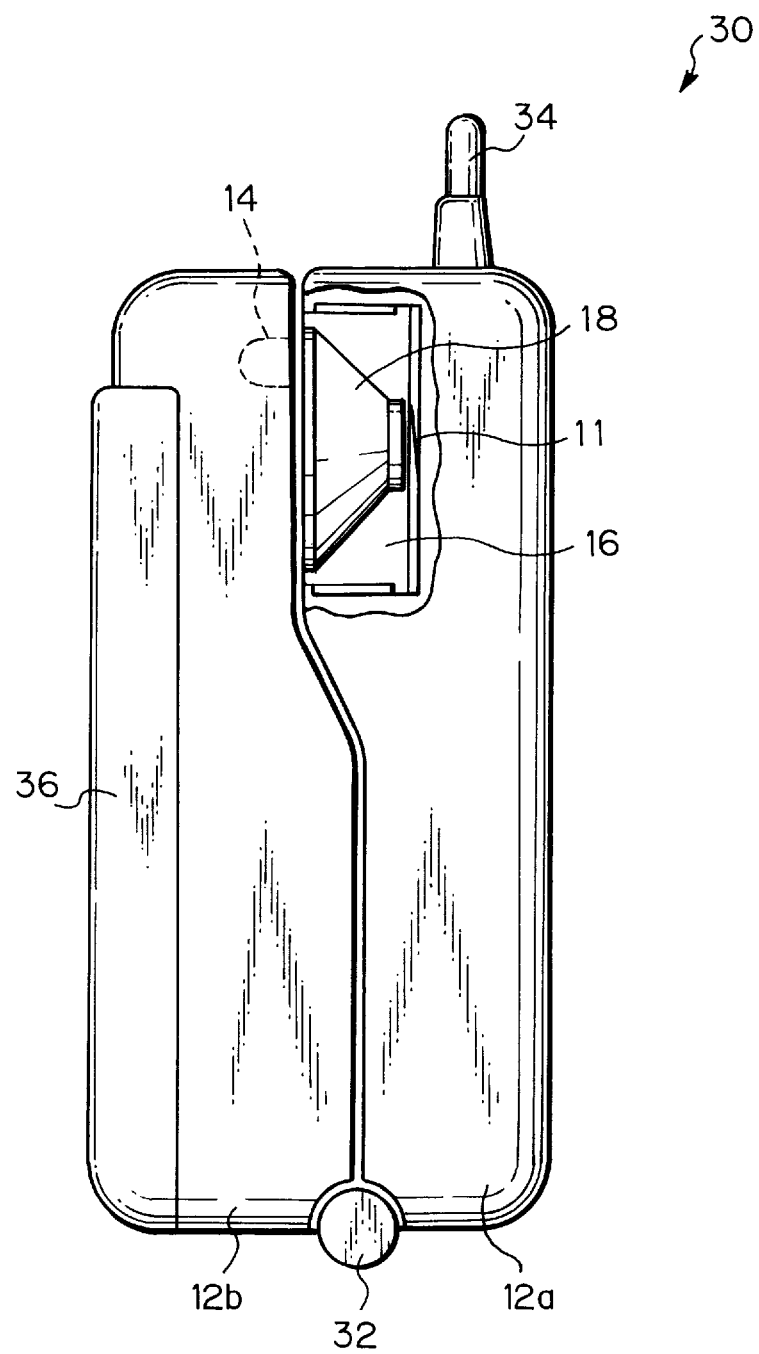
FIG. 4 is a side elevation showing an alternative embodiment of the present invention in a non-operating position.
Figure 5:
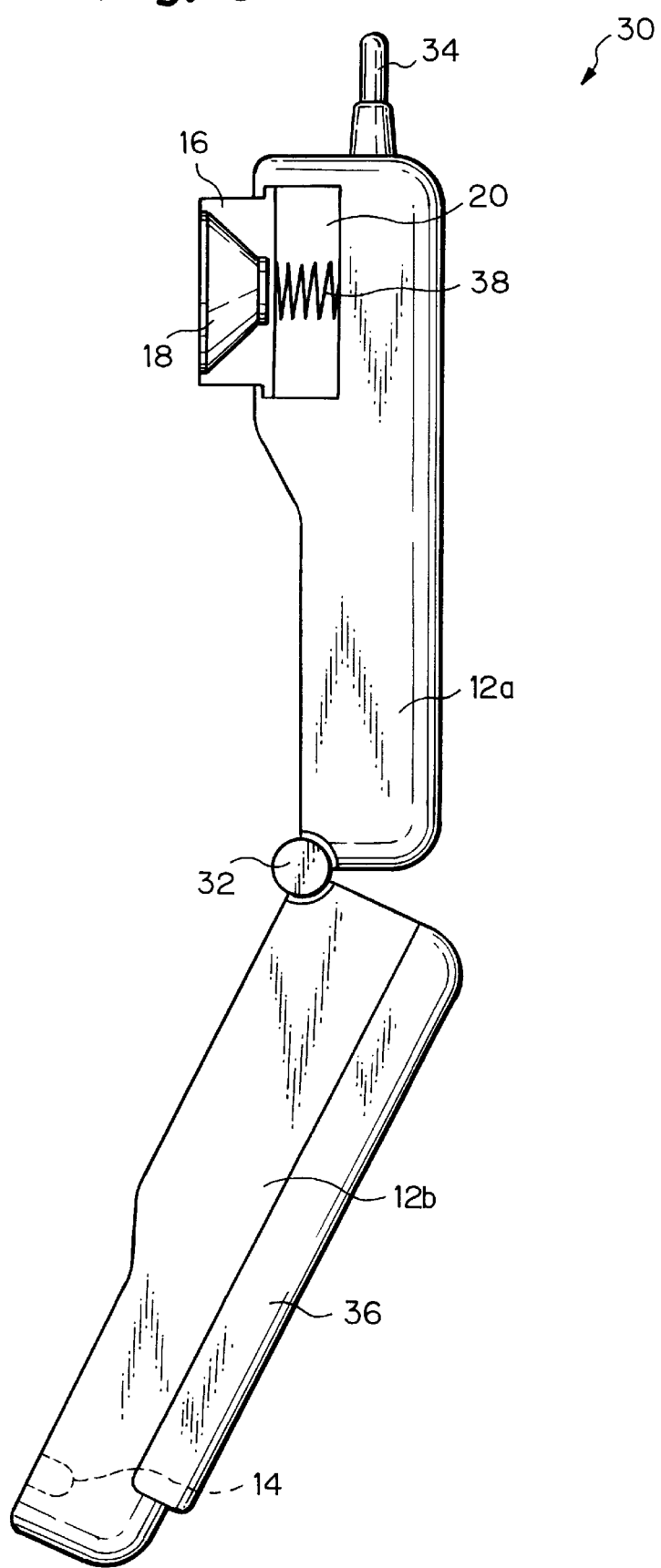
FIG. 5 shows the alternative embodiment in an operating position.

Referring to FIGS. 4 and 5, an alternative embodiment of the present invention is shown. As shown, a telephone 30 is provided with a foldable configuration. In FIGS. 4 and 5, the same constituent parts as the parts shown in FIGS. 1–3 are designated by the same reference numerals.

FIG. 4 shows the telephone 30 in its non-operating or folded position. As shown, two casing parts 12a and 12b included in the telephone 30 are supported by a hinge 32 and positioned to face each other. The speaker casing 16 is pushed into the casing part 12a by the casing part 12b. The reference numerals 34 and 36 designate an antenna and a battery, respectively.

FIG. 5 shows the telephone 30 in an operating or unfolded position. As shown, the casing parts 12a and 12b are held in an unfolded or open position. The speaker casing 16 protrudes from the front end of the casing part 12a due to the action of a coil spring 38. As a result, an air chamber 20 is formed behind the speaker 18 and plays the role of a back cabinet, as stated in relation to the previous embodiment. The back cabinet 20 improves the acoustic characteristic of the speaker 3.

As stated above, the speaker casing 16 is automatically protruded by the coil spring 38 in interlocked relation to the unfolding movement of the casing parts 12a and 12b. This enhances the quality of received speech and thereby improves the conversation quality of the telephone 30 while making the most of merits available with a foldable telephone.

It is to be noted that the speaker casing 16 is adequately locked to the casing part 12a by suitable locking means in each of the positions shown in FIGS. 4 and 5, although not shown or described specifically. When the casing parts 12a and 12b are unfolded, the speaker casing 16 will be automatically unlocked from the casing part 12a.

Because the speaker casing 16 protrudes from the front end of the casing part 12a when the casing parts 12a and 12b are unfolded, it fits with the user's ear in a desirable manner.

In summary, it will be seen that the present invention provides a portable telephone having various unprecedented advantages as enumerated below.

(1) A speaker is mounted on an exclusive casing or speaker casing, physically separate from a body casing on which a microphone is mounted. Only when the telephone is used, the speaker casing protrudes from the front of the body casing with the result that a back cabinet is formed behind the speaker. The back cabinet improves the acoustic characteristic of the speaker and the quality of received speech, thereby improving the conversation quality of the telephone.

(2) Because the speaker protrudes to the outside only when the telephone is used, the quality of received speech is not deteriorated even when the telephone is reduced in size or when it is provided with a foldable configuration.

(3) Rubber rings intervene between the speaker casing and the body casing so as to reduce the acoustic coupling between the speaker and the microphone. This reduces echoes and thereby protects the conversation quality from deterioration ascribable to echoes. Hence, pleasant conversation is insured even on a channel having a noticeable delay.

(4) Because the speaker casing is automatically protruded by a resilient force, the telephone is easy to operate.

(5) When the telephone is provided with a foldable configuration, the speaker casing is automatically protruded in interlocked relation to the unfolding movement of the telephone. Therefore, the telephone is easy to operate and enhances the speech quality without effecting the advantages of the foldable configuration.

Various modifications will become possible for those skilled in the art after receiving the teachings of the present disclosure without departing from the scope thereof.

What is claimed is:

1. A telephone comprising:
   a body casing constituting a body of said telephone; and
   a speaker casing on which a speaker is mounted, said speaker casing being slidably mounted on a front face of said body casing such that said speaker casing is retracted into said front face of the body casing when said telephone is not used and protruded linearly from said body casing in a direction perpendicular to a front surface of the body casing when said telephone is used;
   wherein when said telephone is used, an enclosed air chamber is formed behind said speaker mounted on said speaker casing, the air chamber being delimited conjointly by said speaker casing and said body casing and having a volume which is greater in the use position than it is in the non-use position.

2. A telephone as claimed in claim 1, wherein said speaker comprises a dynamic speaker.

3. A telephone as claimed in claim 1, further comprising damping means intervening between said body casing and said speaker casing and for damping vibration of said speaker.

4. A telephone as claimed in claim 3, wherein said damping means comprises a member having a low vibration transferability.

5. A telephone as claimed in claim 4, wherein said vibration damping means comprises a rubber ring.

6. A telephone as claimed in claim 1, further comprising biasing means for constantly biasing said speaker casing toward an outside of said body casing.

7. A telephone as claimed in claim 6, wherein said biasing means comprises a coil spring.

8. A telephone as claimed in claim 1, wherein said body casing comprises a pair of casing parts foldably connected to each other by a hinge.

9. A telephone as claimed in claim 8, wherein said speaker casing is retracted into one of said pair of casing parts when said pair of casing parts are folded, or protruded from said one casing part when said pair of casing parts are unfolded.

10. A telephone comprising:
    a body casing constituting a body of the telephone, the body casing having a cavity disposed on a front face thereof;
    a speaker casing slidably mounted within the cavity of the body casing, the speaker casing having an open back; and
    a speaker mounted within the speaker casing;
    wherein the speaker casing is capable of assuming an in-use position and a non-use position, the non-use position having the speaker casing withdrawn within the cavity, the in-use position having the speaker casing extended out of the cavity, the speaker casing being capable of moving between the in-use and non-use positions by moving in a direction essentially perpendicular to the front face of the body casing, a rear face of the speaker facing an enclosed air chamber delimited conjointly by the speaker casing and boundaries of the cavity, the air chamber having a volume which is greater in the in-use position than it is in the non-use position.

11. A telephone as claimed in claim 10, wherein said speaker comprises a dynamic speaker.

12. A telephone as claimed in claim 10, further comprising damping means intervening between said body casing and said speaker casing and for damping vibration of said speaker.

13. A telephone as claimed in claim 12, wherein said damping means comprises a member having a low vibration transferability.

14. A telephone as claimed in claim 13, wherein said vibration damping means comprises a rubber ring.

15. A telephone as claimed in claim 10, further comprising biasing means for constantly biasing said speaker casing toward an outside of said body casing.

16. A telephone as claimed in claim 15, wherein said biasing means comprises a coil spring.

17. A telephone as claimed in claim 10, wherein said body casing comprises a pair of casing parts foldably connected to each other by a hinge.

18. A telephone as claimed in claim 17, wherein said speaker casing is retracted into one of said pair of casing parts when said pair of casing parts are folded, or protruded from said one casing part when said pair of casing parts are unfolded.

* * * * *